(12) United States Patent
Kumar et al.

(10) Patent No.: US 7,725,637 B2
(45) Date of Patent: May 25, 2010

(54) METHODS AND APPARATUS FOR GENERATING SYSTEM MANAGEMENT INTERRUPTS

(75) Inventors: Mohan Kumar, Aloha, OR (US); Sarathy Jayakumar, Portland, OR (US); Sham M Datta, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 130 days.

(21) Appl. No.: 11/967,299

(22) Filed: Dec. 31, 2007

(65) Prior Publication Data

US 2009/0172372 A1    Jul. 2, 2009

(51) Int. Cl.
*G06F 13/24*    (2006.01)
(52) U.S. Cl. ...................... 710/268; 710/269
(58) Field of Classification Search .......... 710/260, 710/266, 267, 268, 269
See application file for complete search history.

(56) References Cited

U.S. PATENT DOCUMENTS

| | | | |
|---|---|---|---|
| 5,530,891 A * | 6/1996 | Gephardt ........................ 710/8 |
| 5,630,147 A | 5/1997 | Datta et al. |
| 5,671,422 A | 9/1997 | Datta |
| 5,987,538 A * | 11/1999 | Tavallaei et al. ............. 710/48 |
| 6,272,618 B1 * | 8/2001 | Tyner et al. .................... 712/31 |
| 6,295,573 B1 * | 9/2001 | Bailey et al. ................ 710/260 |
| 6,711,642 B2 * | 3/2004 | Huang ........................ 710/260 |
| 6,775,728 B2 | 8/2004 | Zimmer et al. |
| 6,775,734 B2 * | 8/2004 | Chang ........................... 711/2 |
| 6,968,410 B2 * | 11/2005 | Bennett et al. ............. 710/260 |
| 6,968,412 B1 * | 11/2005 | Nalawadi .................... 710/261 |
| 7,240,137 B2 * | 7/2007 | Aguilar et al. ............. 710/269 |
| 7,257,658 B2 * | 8/2007 | Winkler et al. ............. 710/266 |
| 2002/0099893 A1 * | 7/2002 | Nguyen et al. ............. 710/260 |
| 2003/0093579 A1 | 5/2003 | Zimmer et al. |
| 2004/0015628 A1 * | 1/2004 | Glasco et al. .............. 710/260 |
| 2005/0086547 A1 * | 4/2005 | Kobayashi et al. .......... 713/310 |
| 2007/0061634 A1 | 3/2007 | Marisetty et al. |
| 2008/0040524 A1 | 2/2008 | Zimmer et al. |
| 2008/0115138 A1 | 5/2008 | Nachimuthu et al. |
| 2008/0163331 A1 | 7/2008 | Datta et al. |
| 2008/0288815 A1 | 11/2008 | Kumar et al. |

* cited by examiner

*Primary Examiner*—Khanh Dang
(74) *Attorney, Agent, or Firm*—Trop, Pruner & Hu, P.C.

(57) ABSTRACT

A method includes determining a plurality of memory addresses, each memory address being different from one another. The method further includes generating a plurality of system management interrupt interprocessor interrupts, each system management interrupt interprocessor interrupt having a corresponding processor in a plurality of processors in a system and each system management interrupt interprocessor interrupt including one of the plurality of memory addresses. The method further includes directing each system management interrupt interprocessor interrupt to the corresponding processor. An associated machine readable medium is also disclosed.

11 Claims, 3 Drawing Sheets

METHODS AND APPARATUS FOR GENERATING SYSTEM MANAGEMENT INTERRUPTS

BACKGROUND

A system management interrupt (SMI) is a nonmaskable external interrupt that operates independently from a processor's interrupt- and exception-handling mechanism and a local interrupt controller, such as an Intel advanced programmable interrupt controller (APIC). SMIs take precedence over other non-maskable and maskable interrupts. SMIs directed to a processing core indicate that a processing core is to transition to system management mode (SMM), which is a special-purpose operating mode provided for handling system-wide functions, such as power management, system hardware control, or proprietary OEM (Original Equipment Manufacturers)-designed code, for example.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
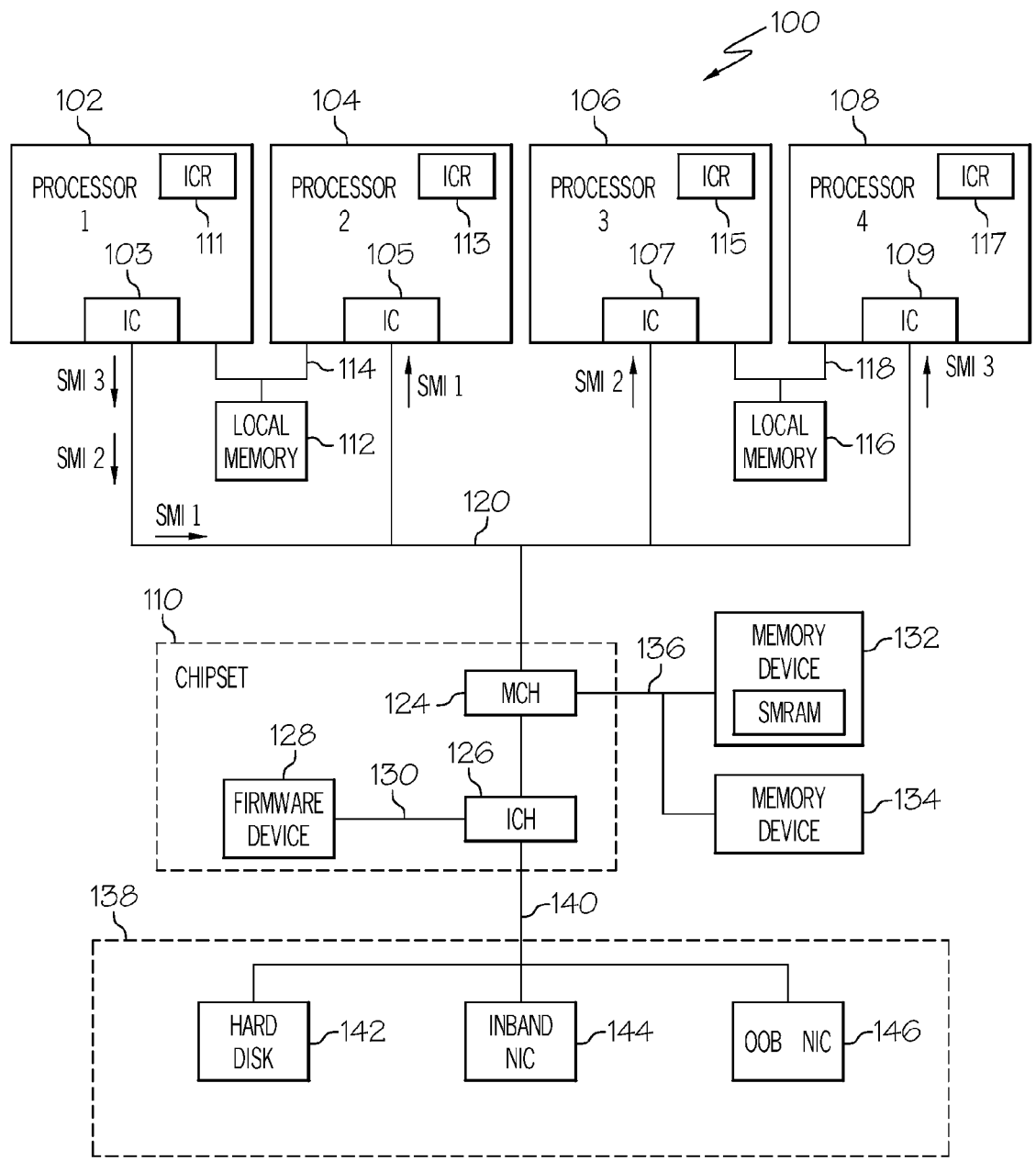
FIG. 1 shows a block diagram of an embodiment of a computing device and associated components.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as types and interrelationships of system components and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring now to FIG. 1, in one embodiment, a computing device 100 includes a plurality of processors 102, 104, 106, 108, a chipset 110, and a plurality of peripheral devices 138. The computing device 100 may be embodied as any type of computing device such as, for example, a desktop computer system, a laptop computer system, a server or enterprise computer system, or a handheld computing device. Each of the processors 102, 104, 106, 108 may be a single core or multi-core processor. Each of the processors 102, 104, 106, 108 may include an interrupt controller 103, 105, 107, 109, respectively. In one embodiment, one or more of the interrupt controllers (ICs) 103, 105, 107, 109 may be an Intel Advanced Programmable Interrupt Controller (APIC). Additionally, each of the processors 102, 104, 106, 108 may include an interrupt command register (ICR) 111, 113, 115, 117. In one embodiment one or more of the interrupt command registers 111, 113, 115, 117 may be an Intel Extended APIC Interrupt Command Register.

In addition to an amount of cache memory, each of the processors 102, 104 106, 108 include, or are otherwise communicatively coupled to, a local memory device. For example, in the illustrative embodiment, the processors 102, 104 are communicatively coupled to a local memory device 112 via a number of signal paths 114. Similarly, the processors 102, 104 are communicatively coupled to a local memory device 116 via a number of signal paths 118. The signal paths 114, 118 may be embodied as any type of signal paths capable of facilitating communication between the processors 102, 104, 106, 108 and respective local memory devices 112, 116. For example, the signal paths 114, 118 may be embodied as any number of wires, printed circuit board traces, via, bus, intervening devices, and/or the like. The memory devices 112, 116 may be embodied as dynamic random access memory devices (DRAM), synchronous dynamic random access memory devices (SDRAM), double-data rate dynamic random access memory device (DDR SDRAM), and/or other volatile memory devices.

Each of the processors 102, 104, 106, 108 is communicatively coupled to the chipset 110 via a number of signal paths 120. Similar to the signal paths 114, 118, the signal paths 120 may be embodied as any type of signal paths capable of facilitating communication between the processors 102, 104, 106, 108 and the chipset 110. For example, the signal paths 120 may be embodied as any number of wires, printed circuit board traces, via, bus, intervening devices, and/or the like. The chipset 110 includes a memory controller hub (MCH) or northbridge 124, an input/output controller hub (ICH) or southbridge 126, and a firmware device 128. The firmware device 128 is communicatively coupled to the input/output controller hub 126 via a number of signal paths 130. Similar to the signal paths 114, 116, the signal paths 130 may be embodied as any type of signal paths capable of facilitating communication between the input/output controller hub 126 and the firmware device 128 such as, for example, any number of wires, printed circuit board traces, via, bus, intervening devices, and/or the like. The firmware device 128 is illustratively embodied as a memory storage device for storing Basic Input/Output System (BIOS) data and/or instructions and/or other information.

The memory controller hub 124 is communicatively coupled to a number of remote memory devices 132, 134 via a number of signal paths 136. Again, similar to the signal paths 114, 118, 130 described above, the signal paths 136 may be embodied as any type of signal paths capable of facilitating communication between the memory controller hub 124 and the remote memory devices 132, 134 such as, for example, any number of wires, printed circuit board traces, via, bus, intervening devices, and/or the like. The memory devices 132, 134 may be embodied as dynamic random access memory devices (DRAM), synchronous dynamic random access memory devices (SDRAM), double-data rate dynamic random access memory device (DDR SDRAM), and/or other volatile memory devices. Additionally, although only two memory devices are illustrated in FIG. 1, in other embodiments, the computing device 100 may include more or less memory devices.

The chipset 110 is also communicatively coupled to a number of peripherals 138 via a number of signal paths 140. Again, similar to the signal paths 114, 118, 130, 136 the signal paths 140 may be embodied as any type of signal paths capable of facilitating communication between the chipset 110 and the peripherals 138 such as, for example, any number of wires, printed circuit board traces, via, bus, intervening devices, and/or the like. The peripherals 138 may include any number of peripheral devices including data storage devices, interfaces, and output devices. For example, as illustrated in FIG. 1, the peripheral devices 138 may include a hard disk 142, an inband network interface card (NIC) 144, and an out-of-band network interface card 146. Additionally, in other embodiments, the computing device 100 may include additional or other peripheral devices depending upon, for example, the intended use of the computing device 100. Further, it should be appreciated that the computing device 100 may include other components, sub-components, and devices not illustrated in FIG. 1 for clarity of the description. For example, it should be appreciated that the memory controller hub 124 may include a video controller for controlling a video display or interface and that the input/output controller hub 126 may include an interrupt controller for generating interrupt events.

During operation, the computing device 100 may allow the processors 102, 104, 106, 108 to enter system management mode (SMM). In one embodiment, each of the memory devices 132, 134 may include RAM used during system management mode operation, referred to herein as "SMRAM," as illustrated in the memory device 132 in FIG. 1. During SMM operation, each of the processors 102, 104, 106, 108 may be transitioned into system management mode. In SMM, each processor 102, 104, 106, 108 may be directed to a specific address in the SMRAM, with an entry point in SMRAM of each processor 102, 104, 106, 108 being referred to as the processor's "SMBASE" address.

In one embodiment, during processor initialization, one of the processors 102, 104, 106, 108 may be selected to act as a "monarch" processor, which may be responsible for relocating the SMBASE addresses of other processors in the system. As illustrated in FIG. 1, the processor 102 may be selected as the monarch processor. In one embodiment, acting as a monarch processor, the processor 102 may generate system management interrupt (SMI) interprocessor interrupts (IPIs) and direct them to the other processors 104, 106, 108. Each processor 104, 106, 108 may receive an SMI IPI from the monarch processor 102 with its respective interrupt controller 113, 115, 117.

In one embodiment, the monarch processor, the processor 102 in FIG. 1 embodiment, may generate a unique memory address of a memory device, such as memory devices 132, 134, for each of the processors 104, 106, 108, as well as for itself. Each unique memory address may be included as information in a separate SMI IPI generated by the monarch processor 102. An SMI IPI may be generated when an event has occurred or is to occur allowing the processors in the computing device 100 to transition to SMM and execute appropriate SMI handler code. Each unique memory address may provide each processor 104, 106, 108 its own SMBASE address. The monarch processor, such as the processor 102, may also generate its own SMBASE address.

In one embodiment, during processor initialization, each SMI IPI generated by the monarch processor 102 may be directed to a particular processor 104, 106, 108 providing a unique memory address, which indicates where in memory the particular processor's SMBASE address, where it may be directed in order to execute SMI handler code. Thus, each processor may have a unique destination memory address for entry into SMRAM. As illustrated in FIG. 1, SMIs 1, 2, 3 are generated by the monarch processor, the processor 102 and are directed to a particular processor 104, 106, or 108. In one embodiment, the respective interrupt controller may recognize that a particular SMI IPI is intended for its associated processor. Upon recognition, the unique memory address included in the SMI IPI may be loaded in into the particular interrupt control register. For example, in FIG. 1, SMI 1 is illustrated as being directed to the processor 104. The interrupt controller 105 may recognize that SMI 1 is intended for the processor 104 and may load the unique memory address contained in the SMI 1 into the interrupt control register 113. The processor 104 is then directed to the SMRAM and enters SMRAM at the memory address loaded into the interrupt control register 113.

Figure 2:
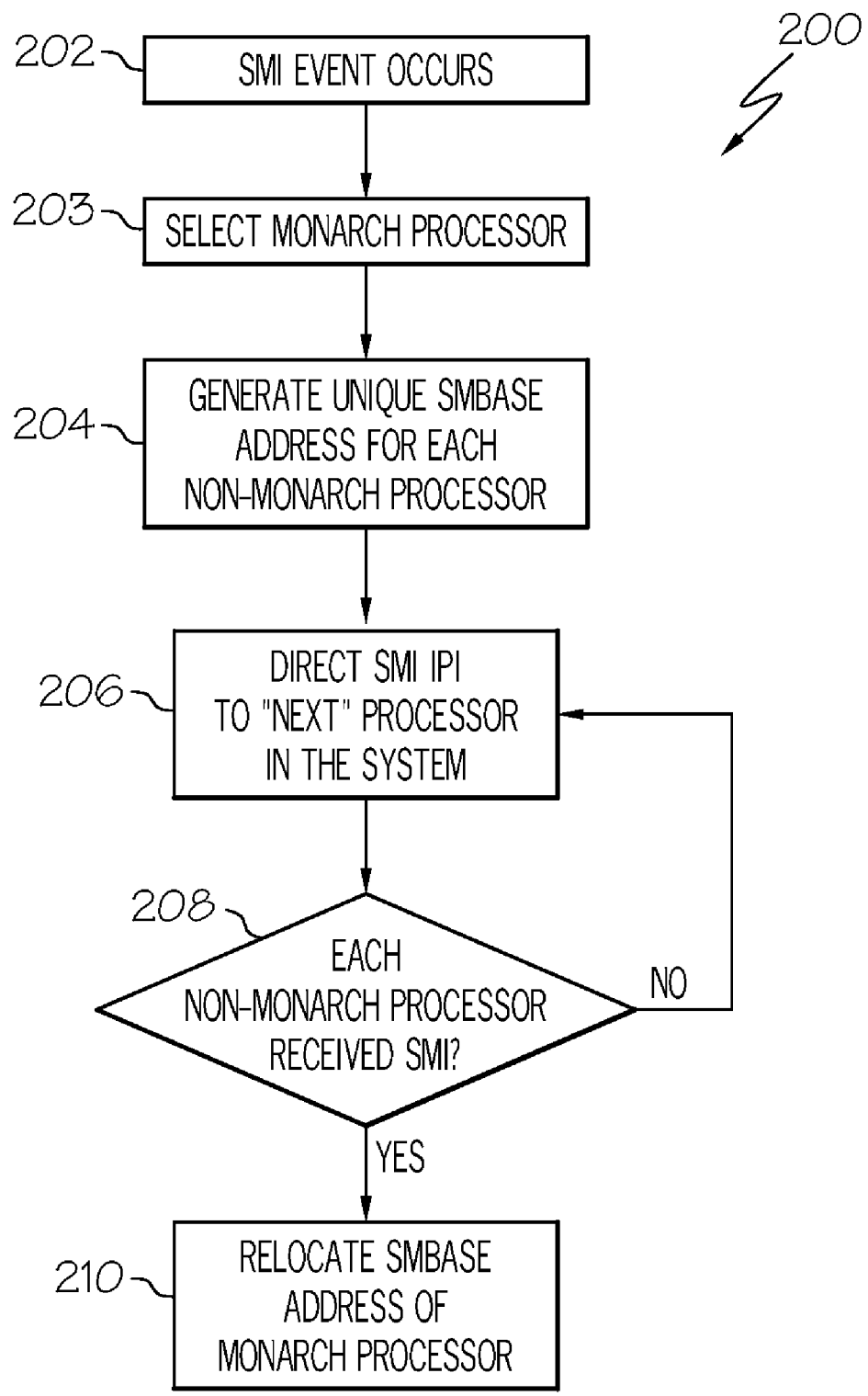
FIG. 2 shows a flowchart of an embodiment of a routine generating system management interrupts.

Referring now to FIG. 2, there is shown a flowchart 200 which illustrates a routine that may be used for directing processors in a system to a memory location in SMRAM in response to receipt of an SMI. At block 202, an SMI event may occur in which each processor in a system, such as the processors 102, 104, 106, 108 of the computing device 100, may be required to enter SMM. It should be appreciated that the SMI events may occur at various times during operation of the computing device 100, such as at when booted and during runtime. At block 203, a monarch processor is selected in the system. In one embodiment, selection of the monarch processor may be accomplished via software that selects the processor from predetermined criteria or through random selection. In another embodiment, selection of the monarch processor may be performed through hardware components.

At processor initialization, SMBASE address relocation may be performed. At block 204, the monarch processor may generate a unique SMBASE address for each processor in the system. At block 206, an SMI IPI is directed to the "next processor" in the system. The "next processor" may refer to any processor other than the monarch processor. As discussed in regard to FIG. 1, in one embodiment, the SMI IPI may be received by an interrupt controller of an associated processor and the SMBASE address contained in the SMI IPI may be loaded into the associated processor's interrupt control register. For example, in the computing device 100, the processor 102 may be selected as the monarch processor and direct each generated SMI to processors 104, 106, 108 in succession. However, it should be appreciated that the order of the processors may be varied.

At block 208, a determination is made as to if each processor in the system, other than the monarch processor, has received an SMI IPI containing its respective SMBASE address. If not, the routine returns to the block 206 to send the next processor in the system its SMBASE address, which may be any processor in the system that has not yet received its SMBASE address. If all non-monarch processors have received their respective SMBASE addresses, the monarch processor may be relocate its own SMBASE address at block 210, which may include generating its own unique SMBASE address and loading it into its interrupt control register.

Figure 3:
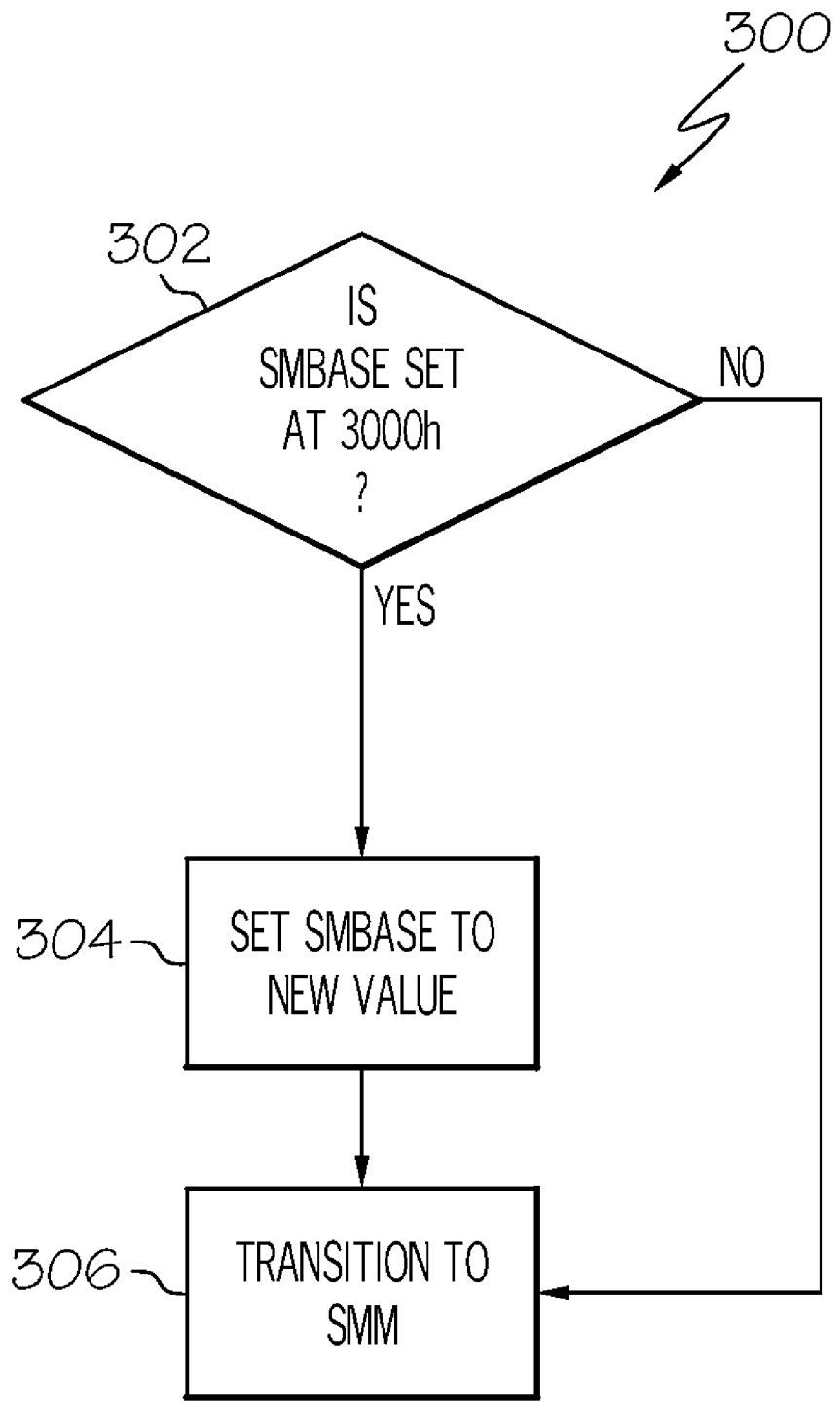
FIG. 3 shows a flowchart of an embodiment of a system management interrupt address verification routine.

Referring now to FIG. 3, there is a flowchart 300 of a routine that may be executed by each processor receiving an SMI IPI. In one embodiment, this routine may be implemented by processors such as the processors 102, 104, 106, 108 in the computing device 100 illustrated in FIG. 1. The routine of the flowchart 300 may be used for security purposes such that each processor receiving an SMI IPI may verify that the SMBASE address received is legitimate, and is not being directed from a non-authorized source. In one embodiment, each SMBASE register, such as the interrupt control registers in FIG. 1, in a system may be initially set to a default memory address value such as 3000 h, for example. At block 302, a processor receiving an SMI IPI may determine if its SMBASE register is set at default address, which may be 3000 h in one example. If the SMBASE register is set to 3000 h, it will set the register to the new SMBASE address contained in the SMI IPI (for example, the new SMBASE address is contained in a destination identification field of the SMI IPI) at block 304. If the SMBASE register is not set to 3000 h (indicating that the processor SMBASE has already been relocated), the processor ignores the SMBASE address contained in the SMI IPI. After the determination at block 302 and subsequent action at either block 304, 306, the processor may transition to SMM.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A method comprising:
  determining, using a monarch processor of a plurality of processors of a system, during initialization of the system a plurality of memory addresses, each memory address being different from one another and corresponding to a relocation address of the corresponding processor at which it is to execute system management interrupt handler code;
  generating, using the monarch processor, a plurality of system management interrupt interprocessor interrupts, each system management interrupt interprocessor interrupt having a corresponding processor of the plurality of processors in the system and each system management interrupt interprocessor interrupt including one of the plurality of memory addresses;
  directing each system management interrupt interprocessor interrupt to the corresponding processor from the monarch processor; and
  verifying with a processor having a system management interrupt interprocessor interrupt directed thereto that an associated interrupt control register of the processor is set to a default address, and loading the associated interrupt control register set to the default address with the memory address included in the system management interrupt interprocessor interrupt directed to the associated processor, and otherwise not loading the interrupt control register with the memory address, and instead ignoring the memory address.

2. The method of claim 1 further comprising, executing the system management interrupt handler code with each corresponding processor, each corresponding processor executing system management interrupt code beginning at the memory address contained in the system management interrupt interprocessor interrupt directed thereto.

3. The method of claim 1 further comprising loading one of the plurality of memory addresses into an interrupt control register of the monarch processor.

4. The method of claim 1, further comprising selecting the monarch processor as the monarch processor during initialization of the system.

5. A system comprising:
  a memory device having system management interrupt handler code stored therein;
  a first processor coupled to the memory device to determine during initialization a plurality of memory addresses different from one another and to generate a number of system management interrupts, each interrupt containing one of the plurality of memory addresses; and
  a plurality of other processors, each coupled to the first processor and to the memory device, each to receive one of the plurality of system management interrupts as an interprocessor interrupt and to execute system management handler code beginning at the memory address contained in the system management interrupt received thereby, wherein each of the plurality of other processors comprises an interrupt control register to load the memory address contained in the received system management interrupt and is to execute software to verify that the interrupt control register is set at a default memory address prior to loading the memory address contained in the received system management interrupt, and if the interrupt control register is not set at the default memory address, to not load the memory address.

6. The system of claim 5, wherein each of the plurality of other processors comprises an interrupt controller to receive one of the plurality of system management interrupts.

7. The system of claim 5, wherein the first processor comprises an interrupt control register, wherein the first processor is to load one of the plurality of memory addresses into the interrupt control register.

8. A machine readable medium comprising a plurality of instructions, that in response to being executed, result in a computing device:
  determining, using a monarch processor of a plurality of processors of the computing device, during initialization of the computing device a plurality of memory addresses, each memory address being different from one another and corresponding to a relocation address of the corresponding processor at which it is to execute system management interrupt handler code;
  generating, using the monarch processor, a plurality of system management interrupt interprocessor interrupts, each system management interrupt interprocessor interrupt having a corresponding processor of the plurality of processors in the computing device and each system management interrupt interprocessor interrupt including one of the plurality of memory addresses;

directing each system management interrupt interprocessor interrupt to the corresponding processor from the monarch processor; and verifying with a processor having a system management interrupt interprocessor interrupt directed thereto that an associated interrupt control register of the processor is set to a default address, and loading the associated interrupt control register set to the default address with the memory address included in the system management interrupt interprocessor interrupt directed to the associated processor, and otherwise not loading the interrupt control register with the memory address, and instead ignoring the memory address.

9. The machine readable medium of claim 8, wherein the plurality of instructions further result in the computing device executing the system management interrupt handler code with each corresponding processor, each corresponding processor executing system management interrupt code beginning at the memory address contained in the system management interrupt directed thereto.

10. The machine readable medium of claim 8, wherein the plurality of instructions further result in the computing device loading one of the plurality of memory addresses into an interrupt control register of the monarch processor.

11. The machine readable medium of claim 8, wherein the plurality of instructions further result in the computing device selecting the monarch processor as the monarch processor during initialization of the computing device.

* * * * *